United States Patent
Pierobon et al.

(10) Patent No.: US 6,178,873 B1
(45) Date of Patent: Jan. 30, 2001

(54) PISTON WITH RELEASABLE ROD CONNECTION FOR REFRIGERATION COMPRESSORS

(75) Inventors: Emilio Pierobon, Belluno; Arcangelo Santamato, Pordenone, both of (IT)

(73) Assignee: Zanussi Elettromeccanica S.P.A., Pordenone (IT)

( * ) Notice: Under 35 U.S.C. 154(b), the term of this patent shall be extended for 0 days.

(21) Appl. No.: 09/284,715

(22) PCT Filed: Sep. 22, 1997

(86) PCT No.: PCT/EP97/05187

§ 371 Date: Apr. 19, 1999

§ 102(e) Date: Apr. 19, 1999

(87) PCT Pub. No.: WO98/19067

PCT Pub. Date: May 7, 1998

(30) Foreign Application Priority Data

Oct. 29, 1996  (IT) ............................................. PN960040 U

(51) Int. Cl.$^7$ ....................................................... F16J 1/14
(52) U.S. Cl. ................................................................ 92/187
(58) Field of Search ............................. 92/187, 188, 189, 92/190, 128

(56) References Cited

U.S. PATENT DOCUMENTS

| 76,448 | * | 4/1868 | Hinds et al. | 92/189 |
| 3,903,752 | * | 9/1975 | Riffe | 92/128 X |
| 5,671,655 | * | 9/1997 | Vollrath | 92/128 |
| 5,701,802 | * | 12/1997 | Junge | 92/190 |

FOREIGN PATENT DOCUMENTS

| 366656 | * | 1/1923 | (DE) | 92/189 |
| 1780571 A3 | * | 12/1992 | (RU) | 92/187 |

* cited by examiner

Primary Examiner—John E. Ryznic
(74) Attorney, Agent, or Firm—Pearne & Gordon LLP

(57) ABSTRACT

A piston and connecting rod includes a connecting rod supporting a piston. The connecting rod has a piston end, with the piston being supported on the connecting rod so that it is moved away from the piston end during pivoting of the connecting rod in response to a predetermined angular movement of its crank end so as to maintain the compression ratio during the combustion phase and increase the dwell period of the piston prior to its descent. The piston includes a rounded recess underneath, and the connecting rod includes a terminal portion with a shape to pivot within the recess. An elastic element snaps into recesses of the piston to hold the rod and piston together.

5 Claims, 2 Drawing Sheets

PISTON WITH RELEASABLE ROD CONNECTION FOR REFRIGERATION COMPRESSORS

The present invention refers to a particular kind of coupling used to link a connecting rod with the associated piston.

To the purpose of more effectively exemplifying the present invention, said connecting rod is assumed to operate in close association with the compression piston of a refrigeration compressor, in particular a compressor for household-type refrigerators, without this of course limiting the scope of the same invention to just such a kind of coupling.

The practice is known from the patent EP 0 608 506 to WHIRLPOOL EUROPE B.V. of bringing about such a coupling between a piston of a hermetically sealed motor-driven compressor and the respective connecting rod by means of a gudgeon pin that is adapted to engage, during the compression phase, the piston walls owing to mere pressure exerted against appropriate recesses provided in the same walls, whereas the suction phase, which notoriously requires just a very small or even no coupling force at all between connecting rod and gudgeon pin (in fact, the pressure itself of the suction gas is such as to ensure the coupling, again by pressure, between said elements), is carried out with the connecting rod that keeps engaging the piston through an elastic element, which has a substantially plane annular shape and is arranged between said two elements.

Such a solution however, although representing a sure improvement with respect to prior-art solutions from a general manufacturing point of view, still has some drawbacks in that the need still arises for two distinct component parts, ie. connecting rod and gudgeon pin, to be manufactured separately, whereas said connecting rod must anyway be provided with the ring required to accomodate the gudgeon pin:

there still occurs a wear-down effect between said component parts, so that there still is a need for a particular lubrication to be provided therebetween:

the elastic element works by sliding, ie. rubbing against the gudgeon pin, so that it undergoes a particularly severe, rapid wear-down effect:

furthermore, the shape itself of the elastic element, due to its working by bending under mere shear stress, does not ensure any absolutely firm coupling between piston and gudgeon pin and this makes it possible for undesired noise to be generated.

From GB 2 235 961 a piston assembly for use with a hydraulic cylinder is known; such a piston assembly is including a piston member defining a recess in an end face and an annular insert located in the recess for receiving an end of a piston rod, the insert including first retention means for retaining the piston rod therein, and second retention means which co-operates with a surface of the piston member to inhibit withdrawal of the insert from the recess.

However such form of realization requires complicated processing due to the fact that the metallic piston has to be worked internally undercut.

Furthermore the use of resilient moulded plastic means 19 has to be avoided inside an hermetic compressor for refrigerators, as the combined effects of freon corrosion, lubricant oil corrosion and high temperature would rapidly destroy such a plastic material.

From U.S. Pat. No. 4,930,405 a compressor is shown having a connecting rod comprising a first and second eye, the first being connected by means of a wrist pin to the reciprocating piston, and the second eye being connected to a crank pin which is on one end of a crankshaft. This crankshaft is orthogonal to the piston stroke and supportes at its other end the rotor of an electric motor. The motor stator is supported on a crankcase that includes a crankshaft bearing portion, a cylinder, a suction and a discharge muffler. This crankcase is mounted within a housing by means of coil springs and this housing is closed with the top portion forming a hermetically sealed unit.

The solution shown by said US patent comprises a two-piece connecting rod, and more specifically a new arrangement comprising a two-part rod that permit easy mounting of the piston, the connecting rod and the crank pin assembly without requiring the provision of additional connecting parts; however such a solution does maintain a traditional mounting technique between the connectin rod and the piston as the well known wrist pin 15 is used for connecting the two parts, and therefore no improvement in the connection between the connecting rod and the piston can be found, and the relevant mass is unchanged.

The patent DE 3030319 shows a solution where the wrist pin is lodged in an hollow element connected with the internal surface of the piston head, instead of in proper holes on the cylindrical surface of said piston.

Such a form of realization does show some advantage from the assembly operation, but it implies a supplementary burdensome working to place and fix such hollow element inside the piston.

It therefore would be desirable, and it actually is a main purpose of the present invention, to provide a technical solution that, when applied to the piston of a refrigeration compressor, eliminates the above mentioned drawbacks and, in particular, simplifies both construction and assembly, especially through a reduction in the part count.

According to the present invention, such an aim is furthermore capable of being reached through the use of techniques and materials that are simple. cost-effective and readily available on the market, without by any means impairing the performance capabilities and the reliability of the respective compressor.

These aims are reached in a type of coupling between connecting rod and piston as described below by way of mere non-limiting example with reference to the accompanying drawings, in which.

Figure 1A:
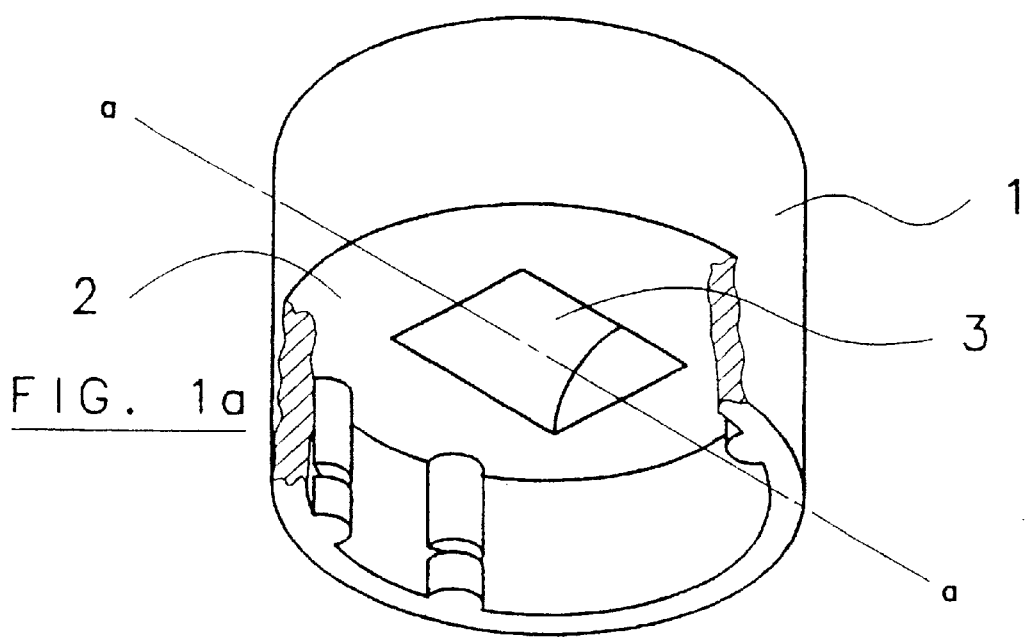
FIGS. 1a, 1b and 1c are three perspective, partially cut-away views of a piston, a respective connecting rod and a respective retaining element, respectively, according to the present invention.

With reference to the above listed Figures, it should first of all be noticed how the gudgeon pin, intended as a distinct mechanical element having the function of linking the connecting rod with the piston, is practically eliminated, while its function is carried out as follows:

the piston 1 is deprived of the holes in which the gudgeon pin is usually inserted, since, as pointed out above, said gudgeon pin is suppressed; on the contrary, the same piston 1 is provided, in its inner surface 2 opposing the working surface on which the pressure is exerted, with a recess 3 having the shape of a portion of a cylinder sectioned by a plane that is parallel to the axis a—a thereof. In other words, said inner surface practically presents a dome in the shape of a portion of a cylinder.

The connecting rod 4 presents in turn, in correspondence of its end portion facing the piston, a terminal portion 5 shaped as a portion of a cylinder being so sized as to be able to couple, even only partially, with said recess 3 provided in the inner surface 2 of the piston.

It is anyway clear that, apart from the mutual compatibility of the relative dimensions, the minimum coupling ability requirement calls for the radius of said two portions of cylinder 3 and 5 as described above to be substantially similar so as to enable the connecting rod to rotate through a limited arc with its terminal portion 5 within the recess 3, owing to the fact that the cylindrical surfaces facing each other at any moment are always substantially in contact with each other.

Such a solution enables a twofold advantage to be obtained in terms of a greater common working surface between connecting rod and piston, with a corresponding reduction in the pressures involved and, therefore, also in the corresponding wear-down effect, and an enhanced lubrication effect brought about by a substantially perfect coupling of the two common surfaces when working.

Furthermore, such a solution clearly makes it possible for even very high stresses between connecting rod and piston to be transmitted during the compression phase, since these elements are in this phase undergoing pressure stresses that force them against each other, so that the proposed solution of common working surfaces gives full assurance of an effective force transmission and, as a result, an effective, problem-free compression of the gas, with a low wear-down and an enhanced lubrication effect.

During the suction phase there is no particular stress or force that must be transmitted from the connecting rod to the piston, owing to the low inertia of the latter and owing also to the fact that, in the first part of the suction stroke, the residual gas available in the cylinder usually keeps up a slight counter-pressure acting on the piston, so that the pulling force on the piston, already very low, is further reduced by said counter-pressure.

Figure 1B:
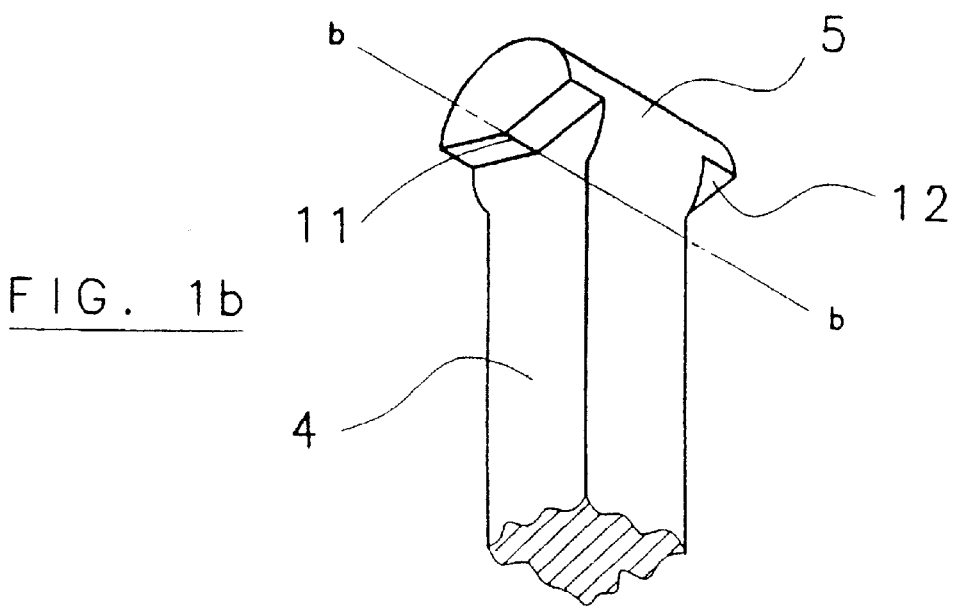
Figure 1C:
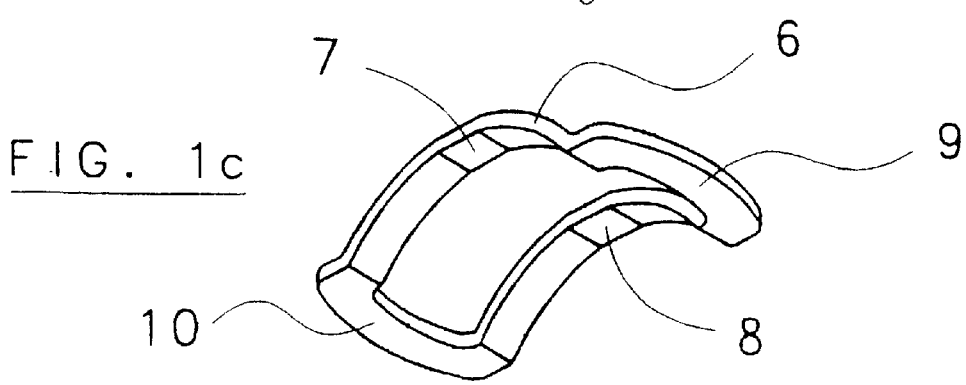

It is however necessary for the piston to remain linked with the connecting rod also during the suction phase and, considering the low forces required, it has been found that such a function can be carried out in a fully satisfactory manner by such an elastic element 6 as best illustrated in FIG. 1c which shows means in the shape of a closed loop, and having approximately the form of a saddle, in which two opposite "upper" portions 7 and 8 can be distinguished., along with two similarly opposite "lower" portions 9 and 10, said upper and said lower elements being arranged alternately.

Said upper portions 7 and 8 are adapted to engage, by simple contact and pressure, against respective reliefs 11 and 12 provided, as this is best shown in FIG. 1b, on the lower side of the terminal portion 5 of said connecting rod, said reliefs being clearly not comprised in and preferably opposite to the cylindrical surface in which the connecting rod terminates.

Figure 2:
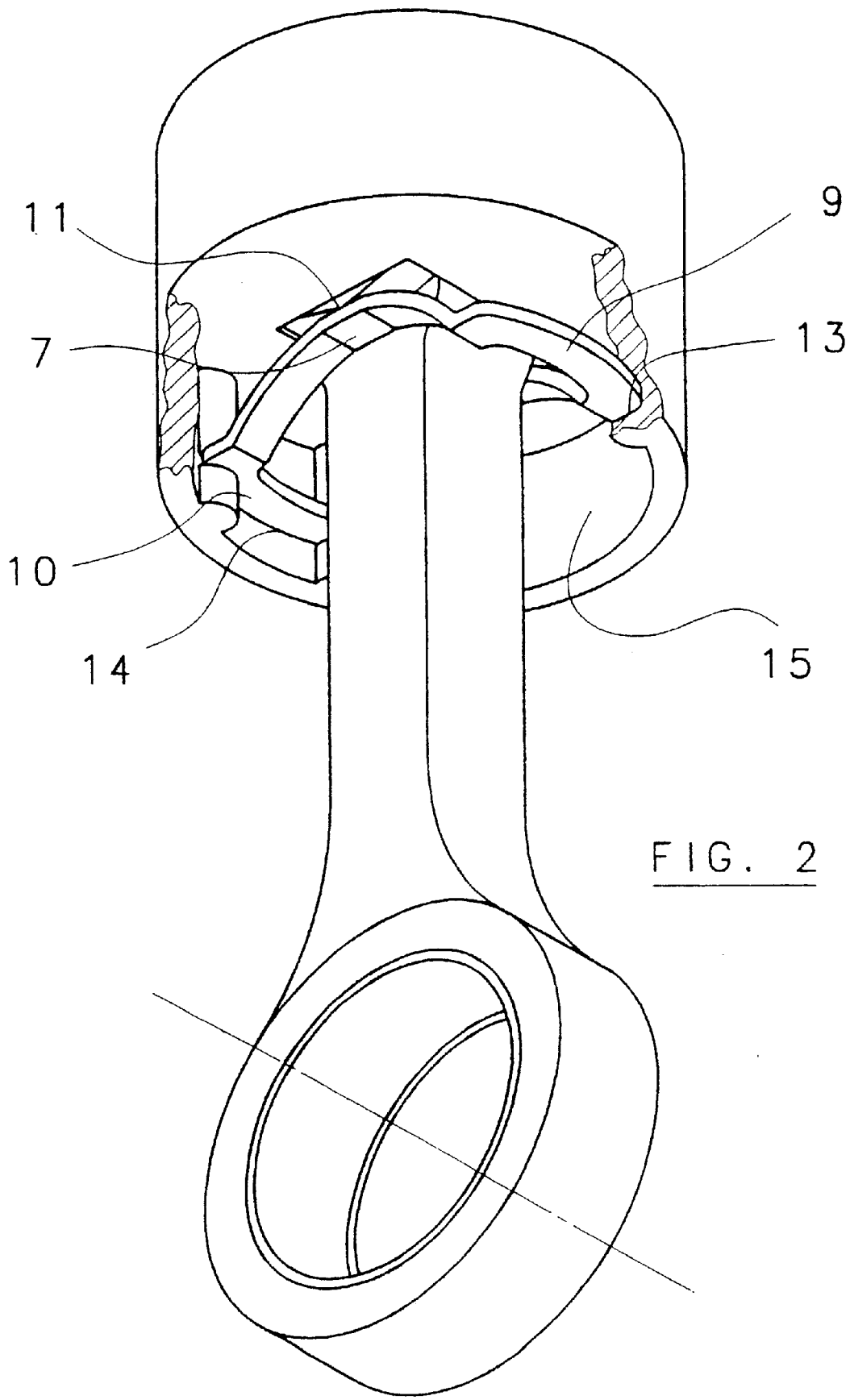
FIG. 2 is a perspective, partially cut-away view of the three component parts shown in the three above cited Figures, after the assembly thereof.

The "lower" portions 9 and 10 of said elastic element 6 are in turn adapted to engage respective recesses 13, 14 which, preferably in the form of horizontally oriented notches, are provided in appropriate positions inside the inner cylindrical surface 15 of the piston, so as this is best illustrated in FIG. 2.

In this manner, after completion of the assembly of the three elements described above, which can be carried out in different manners, and in particular by taking advantage of the elasticity of the element 6, a connecting rod-piston assembly is obtained which is surely effective for use in the intended application, without any problem whatsoever arising in the compression phase thanks to the afore described reasons, as well as without any problem occurring in the suction phase since the saddle-like configuration, or "arch"-like shape, of the elastic element 6, along with the manner it engages the piston, makes it surely possible for the connecting rod to be also able to drive the piston without any undesired lag or even the slightest delay, exactly for the reason that the arch-shaped structure of the elastic element 6; by working in a compressive manner during the suction phase, maintains its original shape almost integrally.

In an advantageous manner, furthermore, the afore cited reliefs 11 and 12 can have their surfaces contacting the upper portions 7 and 8 of the elastic element 6 reduced to mere segments, this being obtained by sharpening the lower extreme edges of said reliefs and giving said corresponding portions 7 and 8 the shape of a plane surface.

Furthermore, said sharp edges so formed by the lower borders of said reliefs 11 and 12 must be arranged along the rotation axis b—b of the terminal portion 5 of said connecting rod with respect to the recess 3. Such a geometric arrangement, in fact, enables friction between said connecting rod and the elastic element 6 to be minimized, since these elements only engage each other by pressure when working.

This solution enables the durability of the respective pressure contacts to be increased and, as a result, ebables the related lubrication requirements to be simplified.

It will be appreciated that the above description and illustrations have been given, with reference to the accompanying drawings, to the mere purpose of exemplifying the present invention, and that a number of variants can be implemented and modifications can be made thereto without departing from the scope of the present invention.

What is claimed is:

1. Electric compressor, in particular for household refrigerating apparatuses, comprising:

a hollow piston (1) without any through-hole provided for accomodating the gudgeon pin.

a connecting rod (4), a recess (3) provided in the inner surface (2) of said piston on the opposite side with respect to the working surface thereof, said recess being adapted to accomodate in a rotatable coupling form both the upper terminal portion of the connecting rod (4) and the coupling elements, one or more coupling elements (11, 12) adapted to link the upper terminal portion (5) of said connecting rod with said piston, elastic means (6) adapted to elastically lock said elements inside said piston and engage themselves, with respect to said piston, against appropriate recesses (13, 14) provided in the inner cylindrical surface (15) thereof, said connecting rod and said coupling elements being made in a single-piece construction, and said coupling means being adapted to reciprocally engage said connecting rod and said piston, and said piston being free from any through-passing holes provided to accomodate the end portions of said gudgeon pin, characterized in that said coupling means are formed by two relief side extensions (11, 12) provided on said upper terminal portion (5) of the connecting rod, on opposite faces thereof.

2. Electric compressor according to claim 1, characterized in that the inner contour of said recess (3) provided inside said piston and the corresponding contour of the assembly formed by said upper terminal portion (5) and the respective coupling elements are semi-cylindrical contours adapted to be coupled reciprocally.

3. Electric compressor according to claim 2, characterized in that said elastic means (6) have an annular shape which is arcuated in a saddle-like manner toward the small end of the connecting rod so as to present, toward the zone which is the closest to the small end of the connecting rod, two lower, preferably mtually opposing portions (9, 10).

4. Electric compressor according to claim 3, characterized in that said portions (9, 10) are adapted to engage appropriate corresponding recesses (13, 14) that are preferably made in a notch-like manner and are provided within the inner cylindrical surface (15) of said piston.

5. Electric compressor according to any of the preceding claims 2 to 4, characterized in that said two relief extensions present a respective sharp edge facing said elastic means, said sharp edges being aligned along the axis (b—b) of rotation of said terminal portion (5) with respect to said piston, said elastic means (6) being provided with substantially plane portions (7, 8) oriented towards said relief extensions (11, 12) so that said sharp edges and said substantially plane portions (7, 8) are capable of mutually engaging owing only to compression.

* * * * *